United States Patent [19]

Rigg

[11] Patent Number: 4,993,910
[45] Date of Patent: Feb. 19, 1991

[54] ADJUSTABLE DEVICE FOR TOWING VEHICLES WITH VERTICAL LIFT

[76] Inventor: Leonard Rigg, R.D. 1, P.O. Box 336, Snow Shoe, Pa. 16874

[21] Appl. No.: 484,901

[22] Filed: Feb. 26, 1990

[51] Int. Cl.$^5$ .............................................. G60P 3/06
[52] U.S. Cl. .................................. 414/563; 280/402; 414/463
[58] Field of Search ............... 414/463, 462, 466, 563; 280/402, 425.1, 479.1

[56] References Cited

U.S. PATENT DOCUMENTS

| | | | |
|---|---|---|---|
| 3,830,522 | 8/1974 | Boucher | 280/490.1 X |
| 4,384,817 | 5/1983 | Peterson | 414/563 |
| 4,391,562 | 7/1983 | Hetzner | 280/490.1 X |
| 4,563,018 | 1/1986 | Stage et al. | 414/563 X |
| 4,632,629 | 12/1986 | Koolma | 414/563 |
| 4,761,015 | 8/1988 | Carr | 280/491.2 X |
| 4,836,737 | 6/1989 | Holmes et al. | 414/563 |

Primary Examiner—Robert J. Spar
Assistant Examiner—Brian K. Dinicola
Attorney, Agent, or Firm—Tracey G. Benson

[57] ABSTRACT

An apparatus for towing vehicles that is fixedly attached to the towing vehicle, so as to provide a longitudinally retractable load bar extension with provisions for coupling to the towed vehicle, and a vertically rotatable load bar to maintain vertical lift of the towed vehicle during movement. The vehicle to be towed is fitted with a mounting bar having inverted coupling seats compatible for towing attachment with the coupling box mounted to the rearward extending end of the load bar extension, such that the operation of the towed vehicle, when uncoupled from the towing apparatus, is not impeded by the mounting bar remaining in place.

9 Claims, 5 Drawing Sheets

ADJUSTABLE DEVICE FOR TOWING VEHICLES WITH VERTICAL LIFT

BACKGROUND—FIELD OF INVENTION

This invention relates to vehicle towing apparatus, and more particularly, a means of towing vehicles with a larger vehicle such as a truck, bus, or motor home, where a partial vertical lifting of the towed vehicle is desirable, but where the towing means can remain on the towing vehicle in an out-of-the-way fashion, when not needed.

BACKGROUND—DESCRIPTION OF PRIOR ART

Although there have been many attempts to design apparatus for towing vehicles, both with and without vertical lift capability for the towed vehicle, many of these devices have not effectively addressed the need to tow vehicles such as passenger automobiles, jeeps, and other recreational vehicles to be used in conjunction with a larger towing vehicle, such as a motor home, touring bus, military conveyance, and the like. Many prior art designs have combined a towing hitch that has been permanently and rigidly attached to the towing vehicle, and that provided a conventional ball hitch to which could be coupled a tow behind trailer, or other towing apparatus. Such devices could be selectively attached to the towing vehicle when needed, and used in conjunction with the rigidly attached tow hitch and ball on a towing vehicle. Prior art examples include patents issued to Kniff (U.S. Pat. No. 3,758,135); Kniff (U.S. Pat. No. 3,885,815); Kniff (U.S. Pat. No. 3,831,980); Nutt (U.S. Pat. No. 3,664,687); and Youngblood (U.S. Pat. No. 4,194,755).

While providing some flexibility and adaptability to the occasional towing of passenger vehicles, the owner or user of prior art devices had the disadvantage of adapting the towing apparatus each time a particular vehicle was to be towed. Furthermore, the user was required to detach the towing apparatus from the towing vehicle after use, and store the towing apparatus until it was next needed. This is a significant disadvantage where storage space, such as a garage, is limited. Prior art devices also created problems where the towed vehicle was used on a trip under circumstances requiring the towing vehicle such as a motor home, and the towing apparatus, to be stored or left in a parking lot, campground, or other unprotected area during use of the towed vehicle such as a jeep or passenger car.

Other prior art towing devices with vertical lift capability have required complicated construction, and movable members to achieve vertical lift, balancing, and load leveling of the towed vehicle with respect to the towing vehicle. In addition to requiring greater complexity in construction, manufacture, and use, these devices presented potential hazards to the user through the existence of pinch points and to the motoring public through improper leveling of the towed vehicle. Examples of such prior art references include patents to Duncan (U.S. Pat. No. 4,577,883); Lind (U.S. Pat. No. 4,473,237); Sebby (U.S. Pat. No. 4,113,272); and Mathisen (U.S. Pat. No. 3,649,046).

Another disadvantage of prior art references for towing vehicles with vertical lift of a portion of the vehicle involves the manner in which the towing apparatus couples with the vehicle to be towed. In situations where the towing device is not itself a trailer riding on the road surface, the towing apparatus required coupling with the vehicle to be towed through the front axles, front suspension system, or other portions of the towed vehicle where adjustments were required for each towing, and where there was a potential for damage to critical portions of the towed vehicle from improper connection.

OBJECTS AND ADVANTAGES

The object of the subject invention is to provide a means for towing vehicles such as passenger cars, jeeps, and other recreation vehicles behind larger motor homes, trucks, buses, or military vehicles where the towing vehicle has sufficient road clearance and weight to sustain a partial vertical lifting to the towed vehicle, through the use of apparatus that is adjustably attached to the towing vehicle, but which can be retracted in an out-of-the-way configuration on the towing vehicle when not in use. By using a device as described herein, a vehicle can be towed to a desired location, such as to a vacation site, area of deployment, or other area where use of the towed vehicle is to be expected. Once the toward vehicle has been decoupled from the towing device, there is no additional apparatus to be stored or left behind, and both the towing vehicle and towed vehicle can be used as intended without the hinderance of a towing apparatus that is not currently in use.

Functionality of the subject invention is achieved by providing a selectively retractable load bar extension fitted into a load bar and axis assembly that is attached to pivot in a vertical plane, to the chassis of the towing vehicle. So constructed, the load bar extension, to which is attached a first coupling means, such as a coupling box, can be retracted into the load bar, and the load bar pivoted upward to the bottom of the towing vehicle chassis, and thus be placed out of the way when towing is not necessary. Safety chains used to insure connection of the towed vehicle to the towing vehicle can be wrapped around chassis extension members to insure that the load bar extension and load bar do not become accidentally dislodged while operating the towing vehicle with the subject apparatus in retracted position during non-use.

Attachment of the first coupling means and load bar/load bar extension combination to the vehicle to be towed is achieved through connection with a second coupling means, such as a towing ball, attached to a mounting bar, which is in turn fixedly, but removably, mounted to the undercarriage of the towed vehicle, so that the second coupling means is in a downward orientation in relation to the towed vehicle. Once installed, the second coupling means and mounting bar assembly may remain on the towed vehicle even after being removed from a towing arrangement, without adversely affecting ground clearance, functionality, or aesthetics of the towed vehicle. When desired, the second coupling means may be removed while leaving the mounting bar in place on the towed vehicle, until such time that towing is again necessary.

A further advantage of the subject invention is interchangeability of towed vehicles fitted with a mounting bar and coupling assembly as described, in relation to other towing vehicles that have been fitted with the subject vertical lift towing apparatus. It is suggested that this interchangeability can provide great utility and benefits in connection with industrial, recreational, military, and heavy construction uses of the towing device.

The subject invention will permit the towing of vehicles with vertical lifting of the forward or rearward wheels of the towed vehicle, depending upon the characteristics of the towed vehicle and other circumstances.

Simple and effective vertical adjustability is achieved through the use of vertically arranged bearing seats on the pivot bearing plates, as well as vertical adjustment pin seats arranged on the rear load bar supports. The load bar extension may be adjusted in a longitudinal relationship to the load bar, through the use of integral positive locking means in conjunction with a pin seat located on the load bar, and a plurality of pin seats compatibly located on the load bar extension.

Figure 7:
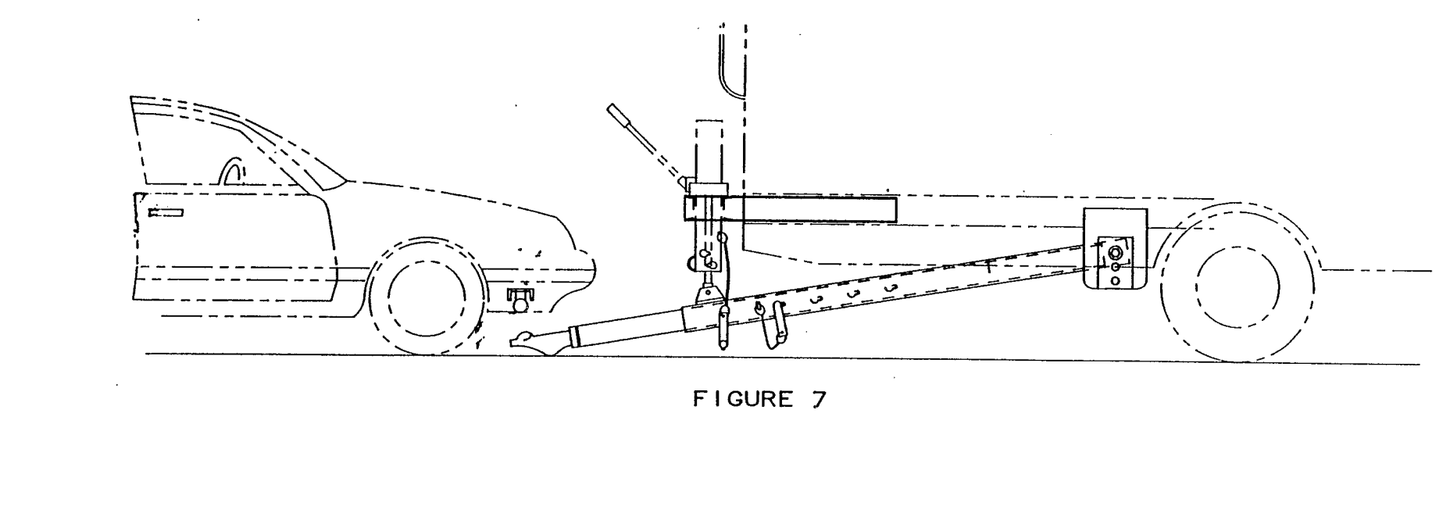
FIG. 7 is a side view of the towing apparatus, as fitted with a hydraulic jack, prior to coupling with the towed vehicle.
Figure 8:
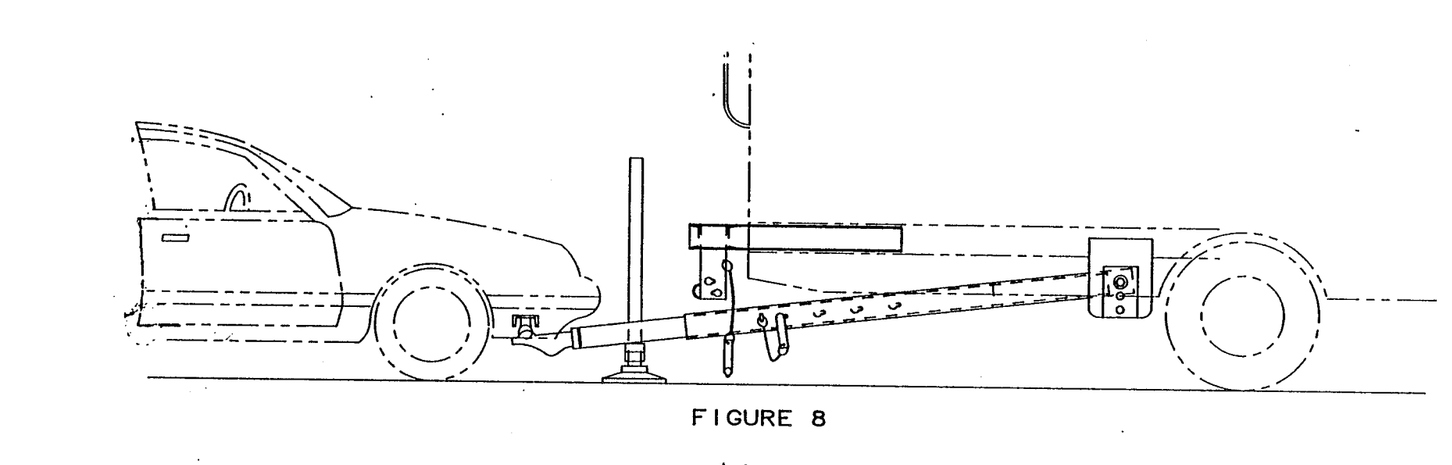
FIG. 8 illustrates the towing apparatus with towed vehicle attached, after longitudinal adjustment of the load bar and load bar extension but prior to vertical lifting.
Figure 9:
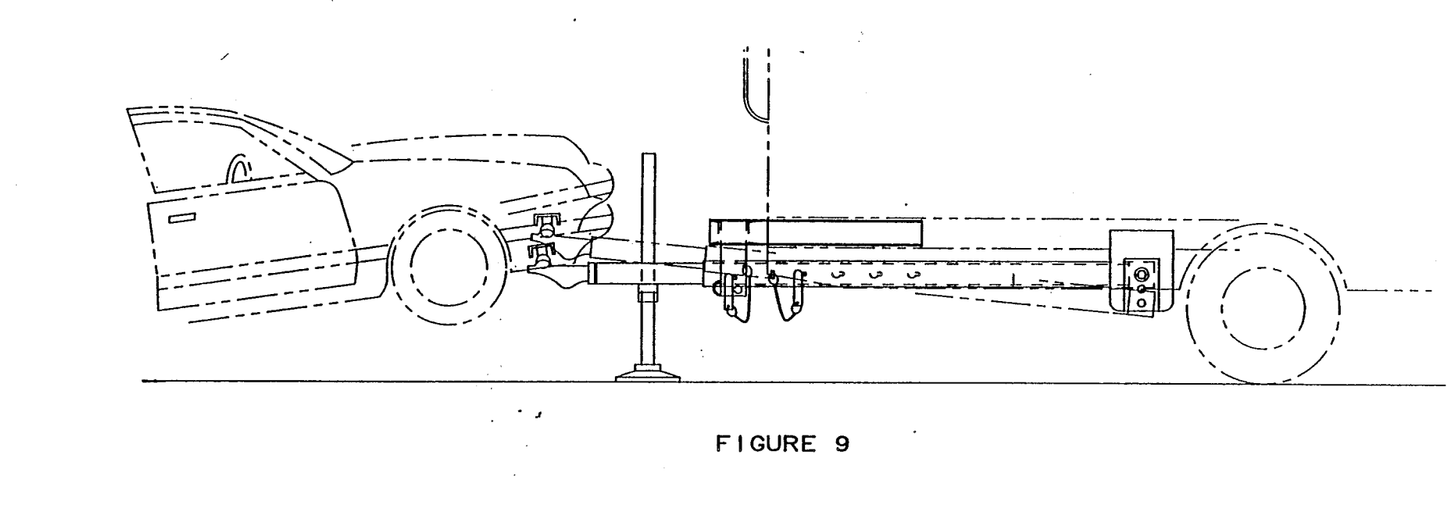
FIG. 9 illustrates two pivot settings of the towing apparatus with towed vehicle attached, after vertical lifting.

By eliminating an integral vertical lift means in the towing apparatus, space, and weight can be saved, and the utility of the device, enhanced. In situations where the towing device will be used in conjunction with recreational vehicles, busses, construction vehicles, and military vehicles, the towing vehicle will in most cases already carry with it a vertical lift means such as a hydraulic or mechanical jack. This can be used to pivotally lift the load bar and load bar extension assembly into position after coupling with the towed vehicle, without unnecessarily complicating the towing apparatus, or duplicating the function to be performed by the jack (FIGS. 8 and 9). In circumstances where vertical lift means such as a jack would not normally be carried by the towing vehicle, a vertical lift means can be incorporated into the apparatus to pivotally lift the load bar and load bar extension into position, or reverse the process in order to disengage the towing vehicle, after coupling (FIG. 7).

By configuring and orienting the second coupling means, such as a towing ball, on the mounting bar in a downwardly direction under the vehicle to be towed, a wide range of towing movement and flexibility in both the forward and reverse directions can be obtained. This flexibility is further enhanced by longitudinal adjustability of the load bar extension with respect to the load bar, so as to position the towing vehicle a desired distance ahead of the towed vehicle, thus increasing the permissible turning arc. By locating the pivot point of the mounting bar and second coupling means underneath the vehicle to be towed, the turning characteristics of the towing and towed vehicle combination are enhanced to facilitate parking, forward, and backward operation of the coupled vehicles.

In addition to being simple and inconspicuous, as well as providing for a quick and easy coupling and decoupling, the subject apparatus provides for stable towing with a three-point hitch comprising the first coupling means and second coupling means assembly, and the two wheels of the towed vehicle that operate along the pavement or driving surface. When using the subject invention with a portion of the towed vehicle in a vertically lifted position, a smoother, shimmy free ride is achieved when compared to towing without vertically lifting a portion of the towed vehicle, particularly in turns.

The subject apparatus also provides for the ability to tow, with a particular towing vehicle of sufficient size, a wide range of vehicles fitted with mounting bar assemblies configured for the particular characteristics of the towed vehicles. This is of particular value where the towing vehicle will remain constant, but the need or desire to tow differing vehicles may change as circumstances dictate.

DETAILED DESCRIPTION

Figure 1:
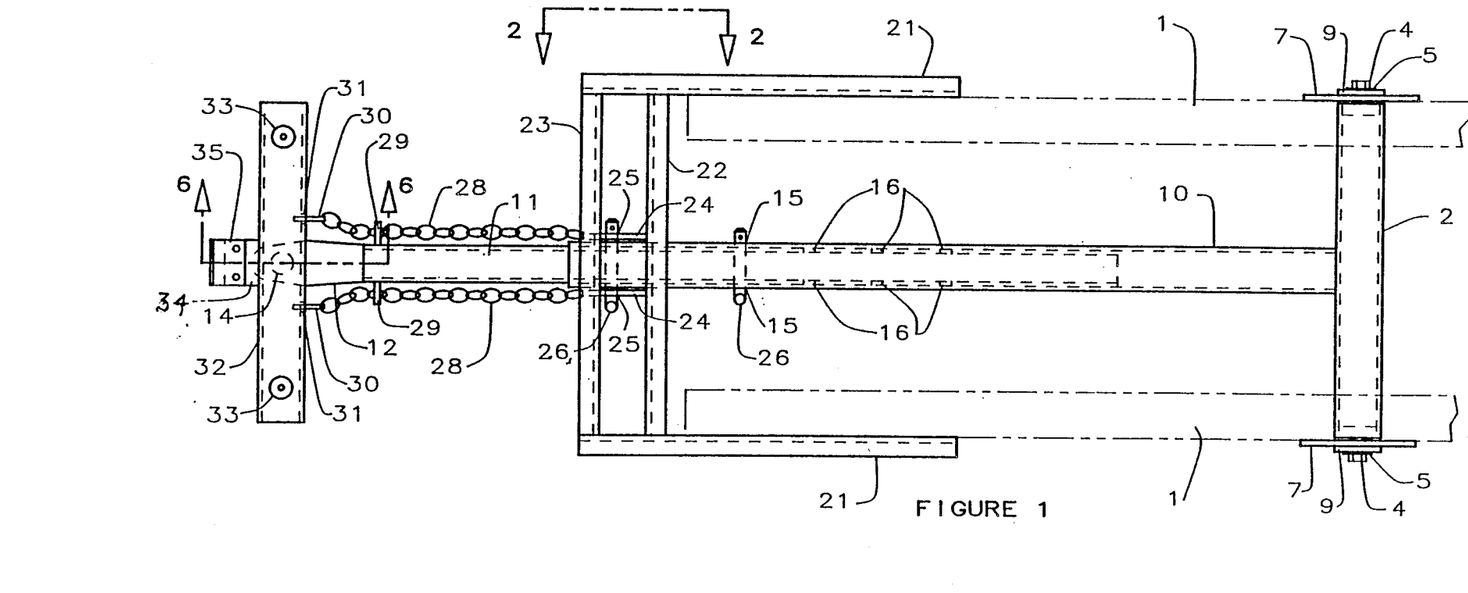
FIG. 1 shows an aerial view of the towing apparatus as it might be attached to a typical chassis of the towing vehicle, and illustrates an aerial view of a preferred second coupling means and mounting bar assembly when joined to a preferred first coupling means.

In a preferred embodiment, the subject apparatus is used in conjunction with a towing vehicle that has a mass, road clearance, and balance characteristics to permit the towing, with partial vertical lift, of the towed vehicle. Onto the chassis of the towing vehicle 1 are fastened a plurality of pivot brackets 7, such that the free ends of said pivot brackets point in a downward orientation with respect to the bracket attachment to the chassis of the towing vehicle. As shown in FIG. 1, the pivot brackets 7 will be mounted onto the outside edges of the chassis 1 so that a pivot axle 2 mounted between said brackets will be perpendicular to the longitudinal center line of the towing vehicle.

Figures 3, 4:
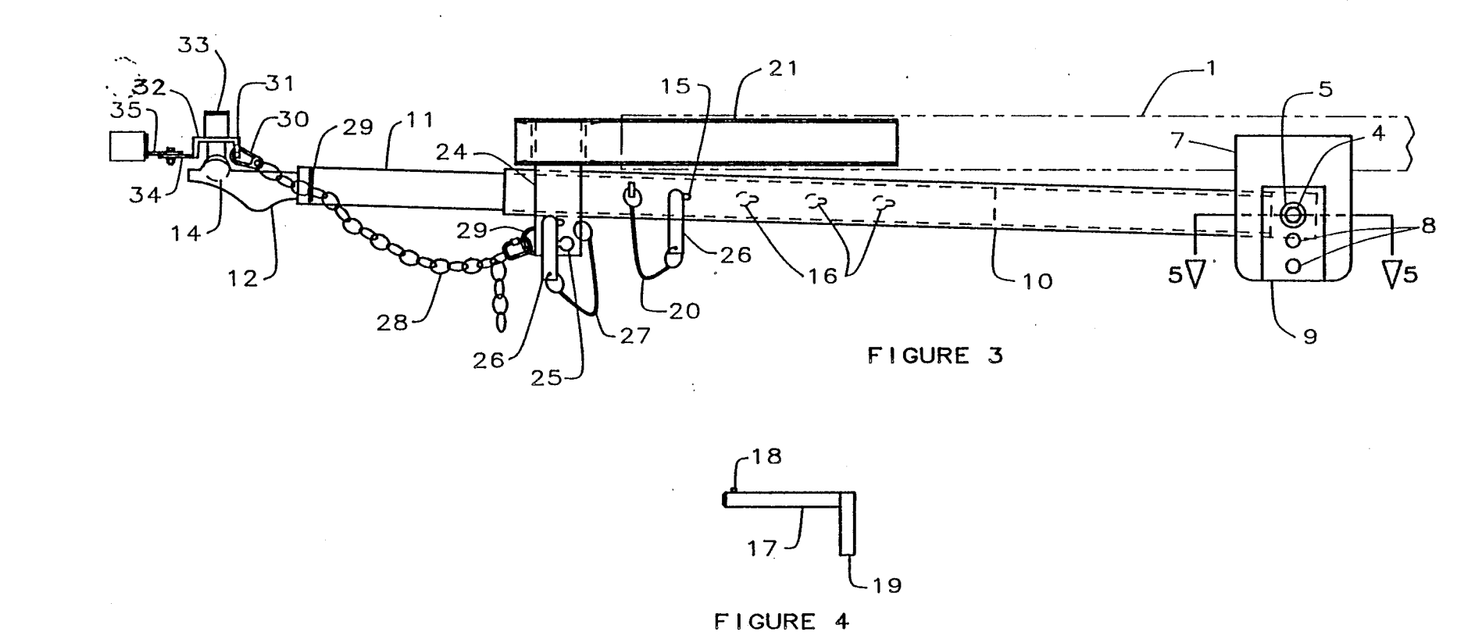
FIG. 3 illustrates a side view of the towing apparatus as coupled to the mounting bar assembly attached to the towed vehicle.
FIG. 4 illustrates a side view of the locking pin assembly configured for selective locking in conjunction with the pin seats on the load bar, load bar extension, and rear load bar supports.
Figure 5:
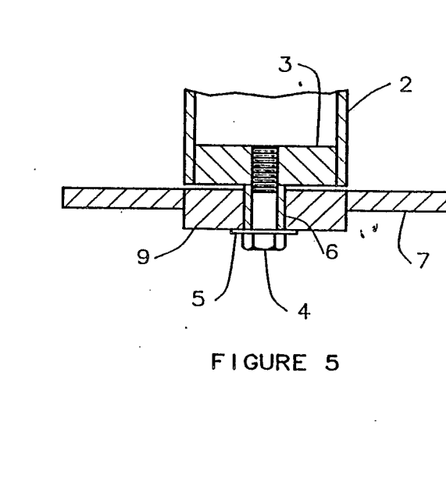
FIG. 5 illustrates a detail of the pivotal mounting between the pivot axle and pivot bearing plate.

As shown in FIGS. 1 and 3, the pivot brackets 7 are equipped with means for vertical adjustment of the pivot axle 2 in relation to the driving surface, which in a preferred embodiment take the form of pivot bearing seats 8 located through the thickness of the pivot bearing plate 9, which is, in turn, fixably mounted to the pivot bracket 7. Referring to FIG. 5, the pivot axle 2 is fixably fitted at each end with a pivot axle end plate 3 having female threads compatible with the partially threaded bolt 4. The pivot axle is mounted between the pivot bearing plates with a partially threaded pivot bolt 4 and washer 5 assembly fitted at each end of the pivot axle. The threaded bolt surface thus threadably connects with the pivot axle end plate, leaving the pivot bearing 6 to rotate inside the selected bearing seat 8 of the pivot bearing plate 9.

Fixedly attached to the pivot axle 2 is a load bar 10, such that the load bar 10 is perpendicular to the pivot axle 2. In the preferred embodiment illustrated in FIGS. 1 and 3, the longitudinal center line of the load bar 10 is equidistant to both ends of the pivot axle 2. The load bar extension 11 is internally and slideably fitted to the load bar 10 along their respective longitudinal axes so as to permit the load bar extension 11 to extend rearwardly beyond the free swinging end of the load bar when used for towing, and to permit retraction with respect to the load bar 10 in a forward orientation, when not in use.

Figure 6:
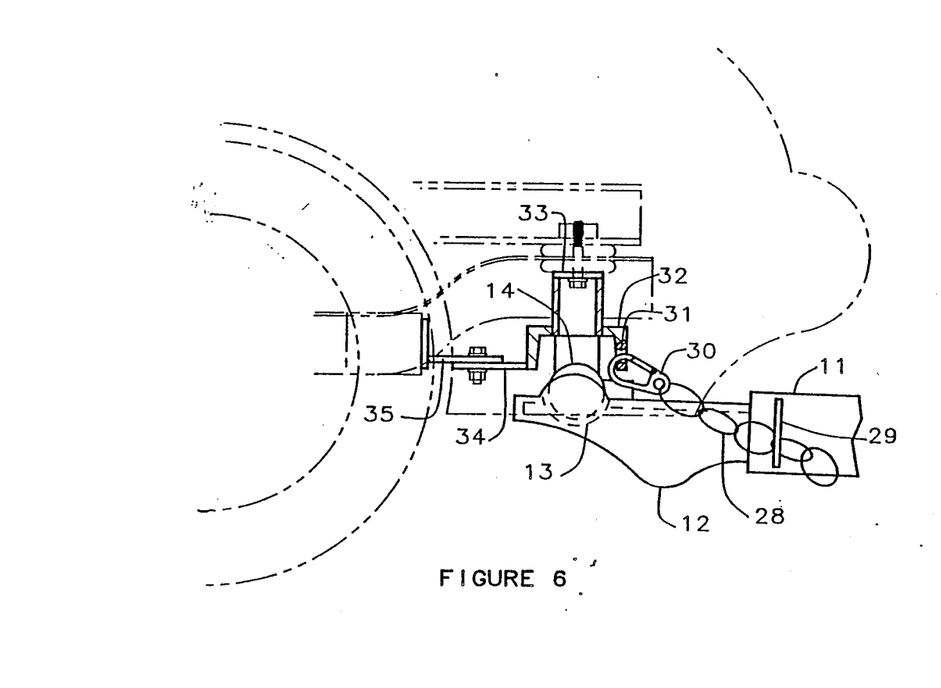
FIG. 6 is a side view detailing the mounting bar assembly as connected to the first coupling means in a preferred embodiment.

Detachably connected to the rearwardly extending end of the load bar extension 11 is a first coupling means, in the preferred form of a coupling box 12. As shown in FIG. 6, the coupling box has an opening 13 with an upwardly pointing orientation with respect to the driving surface, and the preferred second coupling means in the form of the towing ball 14. Looking at FIGS. 1 and 3, the rearward slideability of the load bar extension 11 with respect to the load bar 10 is selectively limited by a horizontally oriented pin seat 15 located along the longitudinal axis of the load bar, and by a plurality of pin seats 16 oriented horizontally along the longitudinal axis of the load bar extension. The longitudinal relationship of the load bar 10 to the load bar extension 11 is established by aligning the horizontal pin seats 15 and 16 as desired, and fixing the positions of these members through the use of integral positive locking means.

Figure 2:
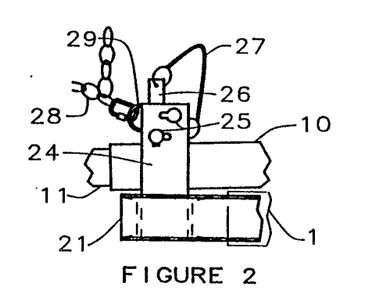
FIG. 2 illustrates an inverted side view detail of the rear load bar support with integral positive locking means, showing the locking nub engaged to prevent removal of the pin.

In a preferred embodiment as shown in FIGS. 2, 3, and 4, the integral positive locking means are comprised of a pin 17 having a locking nub 18 attached to the open end of said pin, and a handle 19 attached to the opposite end of said pin and offset in orientation so as to prevent the locking nub from disengaging from the pin seats when the handle is pointing downward. A means for preventing loss of the pin when disengaged, such as a cable 20, is fixably attached at one end to the handle end of the pin, and at the other end to the load bar 20.

The chassis of the towing vehicle is extended in a rearward direction by means which, in the preferred embodiment shown in FIGS. 1 and 3, employ a plurality of extension members 21 fixably attached in a longitudinal direction to the chassis. The extension members are joined at their rearward extending ends by an inner cross member 22 and an outer cross member 23, both of which are perpendicular to said extension members. Perpendicularly mounted to the cross members in a downwardly direction as illustrated in FIGS. 1, 2, and 3, are two rear load bar supports 24 located so as to cradle the load bar 10 when rotated upward toward the cross members. On each rear load bar support are located pin seats 25 configured to accept integral positive locking means 26 as already described, and with safety cable 27 attached at one end to the pin offset handle, and attached at its fixed end to a rear load bar support.

The pin seats 25 are located so as to permit the user to selectively lock the load bar 10 into a desired vertical position for operation of the towing vehicle, thus enabling the user to adjust the vertical orientation of the towed vehicle with respect to the driving surface. During operation of the towing vehicle, the load bar extension 11 and load bar 10 are maintained in an upwardly rotated position on the underside of the towing vehicle chassis 1, more or less parallel to the driving surface.

Referring to FIGS. 1, 3, and 6, a margin of safety is achieved through the use of chains 28 passing through rings 29 attached to the rearward end of the load bar extension 11 and removably attached to identical rings 29 located on the rear load bar supports 24, so as to prevent the undesired disengaging of the load bar extension 11 from the load bar 10 in the event that the integral positive locking means 26 should fail. The chains have attached to their free ends safety hooks 30 compatible for locking onto the hook seats 31 located on the mounting bar 32.

As shown in FIGS. 1, 3, and 6, connection of the towing vehicle to the towed vehicle is achieved through the use of the above-described apparatus, coupled to a mounting bar 32. The mounting bar 32 will have dimensions and configuration to permit removable attachment onto the forward or rearward underside of the towed vehicle. Said mounting bar is attached with appropriate means to the frame, engine mounts, or other structural members of the towed vehicle at points compatible with the mounting seats 33 configured for mating to the towed vehicle, said mounting seats being located on the mounting bar. The mounting bar will preferably have a torsion arresting tab 34 configured for removable attachment to a torsion arresting seat 35 mounted on the underside of the towed vehicle, or will have other torsion arresting means appropriate to the characteristics of the towed vehicle. Removably attached to the center of the mounting bar 32 is a second coupling means in the preferred form of a towing ball 14 which extends perpendicularly downward from the center of the mounting bar.

The sequence for attachment and vertical lifting of the vehicle to be towed is illustrated in FIGS. 7, 8 and 9. A vehicle to be towed, as fitted with an appropriate mounting bar and ball, is located behind the towing vehicle at a distance desired for the separation of the vehicles during towing. The integral positive locking means are disengaged from the rear load bar supports so as to permit the load bar and load bar extension, and thus the coupling box, to be lowered to the ground. The load bar extension is then positioned longitudinally with respect to the sleeve, so as to achieve the desired spacing between the towing vehicle and the towed vehicle. Once established, this longitudinal relationship between the load bar extension and the load bar is fixed through the engagement of positive integral locking means with the selected pin seat on the load bar extension and the pin seat on the load bar.

FIG. 9 illustrates the towed vehicle after lifting into vertical positioning with respect to the towing vehicle, through the use of a removable jack or other lifting means. The load bar and load bar extension are pivoted in an upwardly vertical arc until the coupling box attached to the load bar extension engages the downwardly extending ball located on the mounting bar of the towed vehicle. The towed vehicle is then lifted vertically by a mechanical jack (FIGS. 8 and 9) or hydraulic jack (FIG. 7) applied to the load bar or load bar extension. Once the desired vertical relationship is achieved, the load bar extension and load bar are locked into place with the insertion of the pin into the desired vertical adjustment pin seats of the rear load bar supports.

The towed vehicle is disengaged from the towing vehicle by reversing the foregoing procedure. Once disengaged, the towed vehicle may be operated with the mounting bar, and if desired the ball, in place if future towing is anticipated. The towing apparatus attached to the towing vehicle may then be forwardly and vertically retracted and fixed through the appropriate selection of horizontal and vertical adjustment pin seats, so as to place the towing apparatus in an out-of-the-way position until next needed.

It is to be understood that while I have disclosed a specific preferred embodiment of my invention, such is illustrative only and the scope of my invention as defined in the appended claims is not limited thereto.

I claim:

1. Apparatus for adjustably and detachably securing a vehicle to be towed on a towing vehicle, with partial vertical lift of the towed vehicle, comprising:
   a. a plurality of pivot brackets spaced for fixed and downwardly oriented attachment to the chassis of a towing vehicle, said brackets having means to facilitate the vertically pivotal mounting of a pivot axle between said pivot brackets along an axis defined by the width of the towing vehicle, and said pivot brackets having means to facilitate selective vertical adjustment of the pivot axle relative to the driving surface;
   b. a pivot axle rotatably and adjustably mounted between said plurality of pivot brackets;
   c. a load bar that is fixedly attached to the pivot axle in a perpendicularly central orientation along the longitudinal axis of the towing vehicle, said load bar having means for providing longitudinal adjustment with respect to a slideably fitted load bar extension;
   d. a load bar extension that is slidably mounted to the load bar in a longitudinal orientation, said load bar extension having means for the longitudinal adjustment of the load bar extension with respect to the load bar, and said load bar extension having means for attachment to a coupling box at its rearwardly located end;
   e. a plurality of rear load bar supports having means to facilitate the vertical adjustment of the load bar with respect to said rear load bar supports, said supports being fixedly mounted to the rearward portion of the chassis of the towing vehicle or to chassis extension means, and said rear supports being mounted so as to form an inverted cradle for the upwardly rotated load bar, and said rear load bar supports having vertical adjustment means, so as to permit the load bar to pivot upwardly into an adjustable cradle space formed by said rear load bar supports, and into a desired vertical orientation for operation of the towing vehicle;
   f. a plurality of integral positive locking means located so as to prevent the undesired longitudinal movement of the load bar extension with respect to the load bar, and the undesired vertical movement of the load bar extension with respect to the rear load bar supports;
   g. a first coupling means attached in an axial direction to the rearwardly extending end of the load bar extension, such that the engaging portion of said first coupling means is oriented in an upwardly pointing direction with respect to the driving surface and the bottom of a towed vehicle; and
   h. a mounting bar configured with mounting means for removable attachment to the undercarriage of a towed vehicle, said mounting bar having a downwardly oriented second coupling means for selective, detachable coupling with said first coupling means, said coupling to provide for universally pivotal movement in both horizontal and vertical planes of the mounting bar with respect to the first coupling means and load bar extension assembly;
   i. a plurality of safety means that are removably attached to the mounting bar, to be rearward end of the load bar extension and to the rear load bar supports, so as to prevent an undesired longitudinal dislocation of the towed vehicle from the towing vehicle, or the load bar extension from the load bar.

2. The towing apparatus of claim 1 wherein the means to facilitate selective vertical adjustment of the pivot axle relative to the driving surface is comprised of a plurality of pivot bearing seats arranged on said pivot brackets so as to facilitate the selective vertical position of the pivot axle relative to the driving surface.

3. The towing apparatus of claim 1 wherein the means to facilitate the vertical adjustment of the load bar with respect to said rear load bar supports is comprised of a plurality of notched pin seats arranged in said rear load bar supports so as to facilitate the rotatably selective vertical position of the rearwardly free end of the load bar relative to the driving surface.

4. The towing apparatus of claim 1 wherein the means for providing longitudinal adjustment of said load bar with respect to a slideably fitted load bar extension is comprised of a horizontally oriented notched pin seat through the diameter of, and located along the longitudinal axis of, said load bar, and a plurality of notched pin seats compatibly located through the diameter of, and along the longitudinal axis of, the load bar extension so as to facilitate the selectively rigid longitudinal positioning of the load bar extension relative to the load bar, with integral positive locking means.

5. The towing apparatus of claim 1 wherein vertical lift means are attached to the towing vehicle chassis, or to chassis extension means, to facilitate vertical raising and lowering of the load bar, load bar extension, and towed vehicle with respect to the driving surface.

6. The towing apparatus of claim 1 wherein the mounting bar and the towed vehicle are equipped with detachable torsion arresting means to limit torsional movement of the towed vehicle with respect to said mounting bar.

7. The towing apparatus of claim 1 wherein the rear load bar supports are equipped with means for positive integral locking of the load bar in a pivotally selectable position with respect to said supports, said means comprising:
   a. A plurality of notched pin seats arranged on the rear load bar supports to facilitate vertically adjustable positioning of the load bar;
   b. A pin having at one end a locking nub compatible for insertion through the notched pin seats in a selected orientation, but incompatible for insertion through said pin seats in a rotatably different orientation;
   c. An offset handle attached to the end of the pin opposite the locking nub and oriented such that after insertion of said locking nub through both rear load bar support pin seats, said handle will rotate downward to place said locking nub in a position incompatible for removal of said nub through the notched pin seats; and
   d. Means to prevent the loss of said pin when disengaged from the rear load bar supports.

8. The towing apparatus of claim 1 wherein the load bar and load bar extension are equipped with means for positive integral locking of the longitudinal load bar extension position with respect to said load bar, said means comprising:
   a. a notched pin seat located through the width of said load bar in a horizontal orientation;

b. a plurality of notched pin seats arranged through the width of the load bar extension in a compatibly horizontal orientation to said load bar pin seats, to facilitate longitudinally adjustable positioning of the load bar with respect to the load bar extension;

c. a pin having at one end a locking nub compatible for insertion through the notched pin seats of the load bar and load bar extension, in a selected orientation, but incompatible for insertion through said pin seats in a rotatably different orientation;

d. an offset handle attached to the end of the pin opposite the locking nub such that after insertion of said locking nub through the load bar pin seat and selected load bar extension pin seat, said handle will rotate downward to place said locking nub in a position incompatible for removal of said nub through the notched pin seats; and e. means to prevent the loss of said pin when disengaged from the rear load bar and load bar extension.

9. The towing apparatus of claim 1 wherein the first coupling means is attached in an axial direction to the rearwardly extending end of the load bar extension, such that the said first coupling means has a female opening that is oriented in an upwardly pointing direction with respect to the driving surface and the bottom of the towed vehicle; and the second coupling means has a male member in a downward orientation with respect to the undercarriage of the towed vehicle so as to provide for selective, detachable coupling with said first coupling means.

* * * * *